Oct. 21, 1924.
R. W. ATKINSON
1,512,444
CABLE INSTALLATION
Filed May 18, 1923
FIG. I.
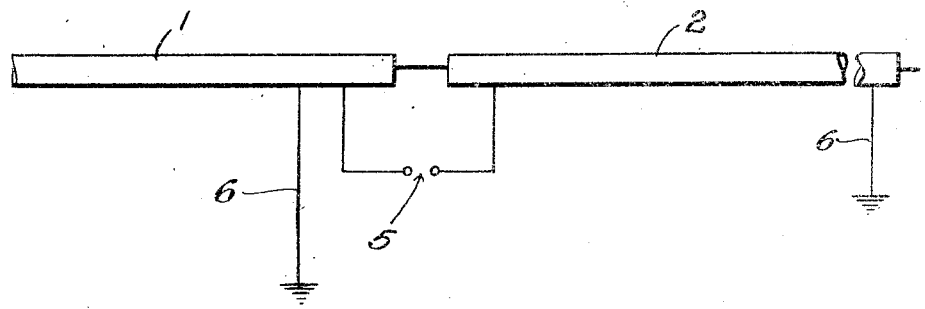
FIG. II.
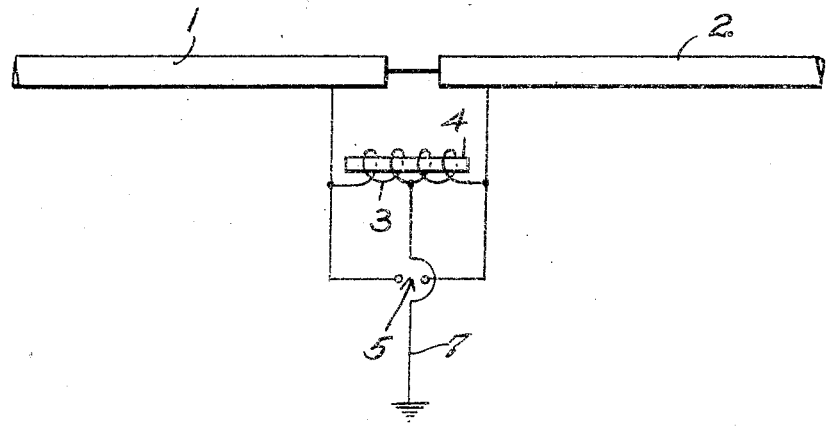
INVENTOR
Ralph W. Atkinson
by Christy and Christy
his attorneys
WITNESSES
J. Herbert Bradley
Harry E. Vandersyde Patented Oct. 21, 1924.

1,512,444

UNITED STATES PATENT OFFICE.

RALPH W. ATKINSON, OF PERTH AMBOY, NEW JERSEY, ASSIGNOR TO STANDARD UNDERGROUND CABLE COMPANY, OF PITTSBURGH, PENNSYLVANIA, A CORPORATION OF PENNSYLVANIA.

CABLE INSTALLATION.

Application filed May 18, 1923. Serial No. 639,826.

*To all whom it may concern:*

Be it known that I, RALPH W. ATKINSON, residing at Perth Amboy, in the county of Middlesex and State of New Jersey, a citizen of the United States, have invented or discovered certain new and useful Improvements in Cable Installations, of which improvements the following is a specification.

My invention relates to improvements in electrical cable installations, and particularly to installations of single-conductor cables for carrying high voltages. The object is to overcome the dangers and difficulties incident to and consequent upon electrical conditions induced in the lead sheath.

In the accompanying drawings Fig. I is a diagrammatic view illustrating the apparatus in the practice of which, according to the ensuing specification, my invention is realized. Fig. II is a similar view illustrating the same essential arrangement but having added thereto certain apparatus whose operation in connection with that wherein the invention centers will be explained in the ensuing specification.

A metal sheath is an all but indispensible feature of a cable built for installation underground, and practically the sheath is made of lead, modified sometimes in physical characteristics by alloying, in a manner well known to the industry.

In high-voltage alternating-current work, the single-conductor structure is capable of service at voltages beyond the capability of the multiple-conductor structure; for example, for a given outside diameter, about twice as high a voltage can be employed with single conductor cables as with three-conductor cables.

In single-conductor installations the effects of induction upon the cable sheath become a difficulty with which the cable engineer has to deal, and this is a difficulty which does not exist to any considerable degree in dealing with a multiple-conductor cable. In a multiple-conductor cable installation, always there is an equipoise of electrical induction; the sum of the oppositely flowing current components is at any instant zero; and therefore there is no such inductive effect upon the cable sheath as requires to be reckoned with. Practically, there is no inductive effect. But in a single-conductor cable installation there is no such neutralization, the effects of induction are actual and substantial; voltage is built up in the cable sheath; and this induced voltage becomes a serious factor with which the engineer has to reckon.

If the lead sheath of a single conductor cable be isolated, so that electrically considered it is merely an elongate conductor in which voltage is induced, it is, in service, a delicate and vulnerable feature of the installation. For instance, if in consequence of a short circuit on some part of the line, there be a sudden rush of current through the conductor, a sudden and great increment in voltage will be induced along the sheath, so great that an electrical discharge may take place between the sheath and ground, or between the sheath of the cable and that of an adjacent cable, in either of which cases there is liable to be a hole burned in the lead sheath and that means eventual ruin of the cable, consequent disturbance of service, and costly replacement. This isolation of the sheath, just described, is in practical use, but because of the great and serious dangers alluded to, it is customary in single-conductor cable installations to ground the sheath at its ends, and commonly also, at intermediate points. Thus, instead of being an isolated length of conducting material, the sheath becomes a closed circuit, and, under the influence of induction, a current flows in the circuit. There is then no localized accumulation of voltage, but instead energy is continually expended and continually dissipated in the form of heat. This loss of energy has commonly been regarded as unavoidable, and engineers have in ordinary installations of single-conductor cables come to look upon such loss of energy as a necessary incident, and have counted upon it and made allowances accordingly. They have expected that in a given installation a certain and calculable percentage of the energy generated must be so lost in transmission. These losses are essentially a cause of reduction in efficiency of transmission, and in some cases cause so great a reduction in current carrying capacity as to make the use of single-conductor cables economically impossible.

It has already been proposed to effect a compromise between the isolated straightaway length of sheath, with its liability to dangerous over-voltages, and the sheath connected to form a closed and grounded circuit, with its necessary attendant energy losses, and the proposal has been to connect the sheath in a closed and grounded circuit, and at the same time to divide the length of sheath into sections, isolated section from section by rings of insulation, and to bridge the rings of insulation with resistance coils, or perhaps with reactance coils. The proposal is a compromise: the danger of electrical discharge is diminished, but not eliminated, and the operating loss is diminished, but not eliminated. Serious difficulties still remain. A resistance so introduced necessarily under service conditions becomes heated, and the heat so generated is a difficulty in the way of practical adoption of the proposal; and even though a reactance coil be used, rather than a resistance coil, still this arrangement is at best a compromise. If sufficient reactance is used to limit the current to low values, dangerously high voltages may develop at time of abnormal conditions. On the other hand, if the reactance is so low as to make abnormal over-voltages improbable, then the current which will flow under normal conditions will be large and in general objectionable.

In an accompanying application of even date herewith, Serial No. 639,825, I have described and claimed that which constitutes a further step in the direction of advance already made, and a step which carries the art beyond a mere proposal to an actual achievement. That invention is characterized by bridging the ring of insulation last alluded to with a reactance into whose coil is introduced a core of soft iron, the parts being so proportioned that under normal conditions of flow the soft iron core approaches magnetic saturation and, as I have explained in the specification in the application alluded to, such a structure acts in a manner analogous to a safety valve, preventing, under normal conditions, excessive losses, and under abnormal conditions allowing a flow of current and thereby preventing accumulation of dangerous voltage. The losses under abnormal conditions are relatively unimportant because of their very short duration while the protection afforded is a vastly more important matter.

My present invention is another specific way of achievement of the same general result. Referring first to Figure I of the drawings, I have there diagrammatically illustrated a length of single conductor cable whose sheath is subdivided into the discontinuous sections 1 and 2. The sheath is suitably grounded. The space between these sections is bridged by a spark gap 5.

When the cable is carrying its normal full-load current, there will be a slight voltage induced along this length of cable, and the voltage so induced can be kept to reasonably low values by division of the sheath into sufficiently short segments. There will however be no flow of current for, as is manifest, the sections are completely isolated. There will therefore be under normal conditions no sheath losses. On the other hand, at times of abnormal conditions, when a very large current is suddenly flowing through the conductor, due for instance to a short circuit at some distant point in the line,—there would then, but for my invention, be a very great rise of voltage along the cable sheath (and therefore above ground at certain points). By the provision of my invention, as soon as this rising voltage reaches a certain predetermined point (a point which may be kept within the range of safety) arcing will take place across the spark gap 5 and the voltage will be relieved.

The peculiarity of a spark gap is that its resistance is practically infinite, until the voltage across it rising reaches a certain value. Then there is a discharge or an arc across the gap, and when this occurs the resistance becomes very low. When then in the practice of the apparatus which I am describing an arc occurs across gap 5 there will be a large flow of current through the sheath and across the spark gap but, as I have already intimated, this condition is one of abnormal occurrence and of brief duration. The loss therefore is relatively unimportant as compared with the relative gain in safety to the apparatus.

In using the word spark gap I intend any form of gap either at atmospheric or at other pressure, or any suitable form of lightning arrester.

From the description of the function of the spark gap it is clear that its function is exactly that of the inductance coil provided with a core in a condition approaching magnetic saturation. That is to say its function is identically that of the apparatus of the companion application alluded to above. There are however certain inherent differences in the performance of these two types of apparatus. The iron-cored inductance will allow the flow of current to take place through the sheath, i. e., act as a safety valve, at a lower voltage than can ordinarily be obtained with a spark gap. On the other hand, the spark gap will function practically, regardless of the frequency. It is conceivable that the sheath current might under certain conditions be an oscillatory one, or it might be a current of high frequency, and in such case it might be difficult for the iron-cored inductance of the companion application to function at the voltage for which it is designed. The spark gap however would arc over and would allow the flow of current at very closely the same voltage as for a current of normal commercial frequency.

From what has gone before I reach the conclusion and here lies a further feature of my invention illustrated in Figure II. The ideal arrangement I find to be the combination of the two expedients, that which is described in my companion application alluded to, and that which I have just described in this application. I bridge the gap of the lead sheath both with the iron-cored inductance and with the spark gap, these two features being arranged in parallel.

The grounding of the sheath may be effected in any preferred manner. In Fig. I grounding 6 is indicated to be made at the corresponding ends of the two adjacent sections 1 and 2. In Fig. II grounding 7 is indicated to be made from the mid-point of inductance coil 3.

I claim as my invention:

1. In an electrical installation the combination with a grounded metal-sheathed cable whose sheath is broken in its continuity, of a spark-gap bridging such break.

2. In an electrical cable installation the combination with a metal-sheathed cable whose sheath is broken in its continuity, of an impedance device bridging such break, and a spark-gap also arranged in such break, the cable sheath being connected through said impedance in closed and grounded circuit.

3. In an electrical cable installation the combination with a metal-sheathed cable whose sheath is broken in its continuity, of an automatically variable reactance bridging such break, and a spark-gap also arranged in such break, the cable sheath being connected through said reactance in closed and grounded circuit.

In testimony whereof I have hereunto set my hand.

RALPH W. ATKINSON.

Witnesses:
LESLIE D. KUHN,
KENNETH P. LIND.